United States Patent [19]

Shouji et al.

[11] Patent Number: 5,691,838
[45] Date of Patent: Nov. 25, 1997

[54] INFRARED-BLOCKING OPTICAL FIBER

[75] Inventors: Masuhiro Shouji; Hiroki Katono; Takeo Ogihara; Teruo Sakagami, all of Iwaki, Japan

[73] Assignee: Kureha Kagaku Kogyo Kabushiki Kaisha, Tokyo, Japan

[21] Appl. No.: 467,545

[22] Filed: Jun. 6, 1995

[30] Foreign Application Priority Data

Jun. 16, 1994 [JP] Japan ................... 6-156408

[51] Int. Cl.$^6$ ............... F21V 9/04; G02B 5/08; G02B 5/20; C08F 30/00
[52] U.S. Cl. ............ 359/359; 359/360; 359/350; 359/885; 525/326.6
[58] Field of Search ................ 359/350, 359, 359/360, 584, 589, 885, 886; 525/326.6

[56] References Cited

U.S. PATENT DOCUMENTS

| | | |
|---|---|---|
| 4,273,098 | 6/1981 | Silverstein . |
| 4,822,120 | 4/1989 | Fan et al. .................. 359/360 |
| 5,466,755 | 11/1995 | Sakagami et al. .......... 359/350 |
| 5,529,848 | 6/1996 | D'Errico ................... 359/360 |

FOREIGN PATENT DOCUMENTS

| | | |
|---|---|---|
| 0 160 510 | 11/1985 | European Pat. Off. . |
| 0 586 135 | 3/1994 | European Pat. Off. . |
| 28 20 678 | 11/1978 | Germany . |
| 6-118228 | 4/1994 | Japan . |

OTHER PUBLICATIONS

Databse WPI, Section Ch, Week 7925, Derwent Publications Ltd., London, GB; AN 79-46371B XP002000384 of JP-A-54 058 719 (Teijin KK), 11 May 1979.
Patent Abstracts of Japan, vol. 95, No. 7, 31 Aug. 1995 of JP-A-07 100996 (C I Kasei Co., Ltd.), 18 Apr. 1995.
Patent Abstracts of Japan, vol. 010, No. 107 (C-341), 22 Apr. 1986 of JP-A-60 235746 (Nihon ITA Glass KK), 11 Nov. 1985.
Patent Abstracts of Japan, vol. 01, No. 302 (C-0855), 2 Aug. 1991 of JP-A-03 112833 (Nippon Sheet Glass Co., Ltd.), 14 May 1991.
Patent Abstracts of Japan, vol. 007, No. 219 (C-188), 29 Sep. 1983 of JP-A-58 117228 (Mitsubishi Monsanto Kasei KK; Others: 01), 12 Jul. 1983.
Patent Abstracts of Japan, vol. 013, No. 083 (M-802), 27 Feb. 1989 of JP-A-63 281837 (Takiron Co., Ltd.), 18 Nov. 1988.
Patent Abstracts of Japan, vol. 014, No. 373 (M-1009), 13 Aug. 1990 of JP-A-02 136230 (Takiron Co., Ltd.), 24 May 1990.
Patent Abstracts of Japan, vol. 013, No. 187 (C-592), 2 May 1989 of JP-A-01 014129 (Hitachi Ltd.), 18 Jan. 1989.

*Primary Examiner*—Paul M. Dzierzynski
*Assistant Examiner*—Audrey Chang
*Attorney, Agent, or Firm*—Frishauf, Holtz, Goodman, Langer & Chick, P.C.

[57] ABSTRACT

Disclosed herein is an infrared-blocking optical filter having optical properties that the transmittance to rays in a visible region is excellent while rays in a near infrared region, particularly, in a wavelength range longer than 1200 nm are cut off or attenuated with high efficiency. The infrared-blocking optical filter includes a transparent substrate and either of the following infrared-blocking film (A) and (B) provided on a surface of the transparent substrate. Film (A): an infrared-blocking film formed on a synthetic resin in which fine powder of metal oxide material composed of indium oxide and/or tin oxide is dispersed; and Film (B): an infrared-blocking film formed of a deposit of a metal oxide material composed of indium oxide and/or tin oxide. The infrared-blocking film may be formed on a transparent support member to constitute an infrared-blocking composite film which is provided on a surface of the transparent substrate to form an infrared-blocking optical filter.

14 Claims, No Drawings

INFRARED-BLOCKING OPTICAL FIBER

BACKGROUND OF THE INVENTION

1) Field of the Invention

The present invention relates to an infrared-blocking optical filter, and particularly to an infrared-blocking optical filter having optical properties that the light transmittances in a wavelength range from a near infrared region to an intermediate or far infrared region are low, and hence it has non-transmissibility or impermeability to infrared rays, which is suitable for cutting off or attenuating heat rays, while it remains excellent light transmittances in a visible region.

2) Description of the Background Art

Optical filters made of inorganic glass, in which a copper ion is incorporated in a special kind of phosphate glass material, have heretofore been used as photometric filters and luminosity factor-compensating filters for cameras. With a view toward improving low durability and poor water resistance, which are shortcomings of these optical filters made of inorganic glass, there has been proposed an optical filter formed of a synthetic resin material containing phosphate groups and divalent copper ions (Japanese Patent Application No. 82527/1993).

These optical filters are excellent in performance of cutting off or attenuating rays in a near infrared region of 750–1100 nm in wavelength, but not satisfactorily desirable in performance of cutting off or attenuating rays in a wavelength range longer than 1200 nm. Accordingly, they do not meet both of two properties of high transmittance to visible rays and sufficient heat ray-screening property simultaneously.

There has thus been a strong demand for development of a material having optical properties excellent in transmittance to rays in a visible region as well as in performance of cutting off or attenuating rays in a wavelength range from a near infrared region to a far infrared region.

It is also desirable that the material having such optical properties be light in weight, free from devitrification even in a high-humidity atmosphere and easy to be processed in forming or molding process.

SUMMARY OF THE INVENTION

The present invention has been made with the foregoing circumstances in view and led to completion on the basis of finding that a metal oxide material composed mainly of indium oxide and/or tin oxide has optical properties that near infrared rays in a wavelength range longer than 1200 nm are cut off or attenuated with high efficiency.

It is thus an object of the present invention to provide an infrared-blocking or infrared-non-transmissible optical filter having optical properties that the transmittance to rays in a visible region is excellent while rays in a near infrared region, particularly, near infrared rays in a wavelength range longer than 1200 nm are cut off or attenuated with high efficiency.

According to the present invention, there is thus provided an infrared-blocking optical filter comprising a transparent substrate and either of the following infrared-blocking films (A) and (B) provided on a surface of the transparent substrate:

Film (A):
an infrared-blocking film formed of a synthetic resin in which fine powder of a metal oxide material composed of indium oxide and/or tin oxide is dispersed; and Film (B):
an infrared-blocking film formed of a deposit of a metal oxide material composed of indium oxide and/or tin oxide.

According to the present invention, there is also provided an infrared-blocking optical filter comprising a transparent substrate and an infrared-blocking composite film provided on a surface of the transparent substrate, wherein the infrared-blocking composite film comprises a transparent support member and either of the above-described infrared-blocking films (A) and (B) formed on a surface of the transparent support member.

The infrared-blocking composite film may preferably be laminated on the transparent substrate in such a state that the infrared-blocking film comes into contact with the surface of the transparent substrate.

The transparent substrate may preferably be formed of a material having light transmittances of 40–98% at a wavelength of 400 nm, 60–99% at a wavelength of 500 nm, 10–95% at a wavelength of 600 nm, at most 80% at a wavelength of 700 nm and at most 70% at a wavelength of 750 nm.

The transparent substrate may preferably comprise a copolymer component obtained by copolymerizing a monomer composition composed of a phosphate group-containing monomer represented by the following formula I and a monomer copolymerizable therewith, and a metal ion component composed mainly of a divalent copper ion:

Formula I:

$$PO(OH)_n R_{3-n}$$

wherein R means a polymerizable functional group represented by the following formula II, and n stands for 1 or 2:

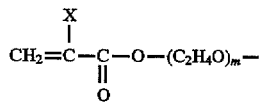

Formula II:
$$CH_2=\underset{\underset{O}{\|}}{\overset{\overset{X}{|}}{C}}-C-O-(C_2H_4O)_m-$$

in which X denotes a hydrogen atom or a methyl group, and m stands for an integer of 0–5.

The infrared-blocking optical filter according to the present invention includes (A) the infrared-blocking film formed of a synthetic resin in which fine powder of a metal oxide material composed of indium oxide and/or tin oxide is dispersed; or (B) the infrared-blocking film formed of a deposit of a metal oxide material composed of indium oxide and/or tin oxide, provided on a surface of the transparent substrate and hence has optical properties that the transmittance to rays having a wavelength of a visible region is excellent while the light transmittances in a near infrared region, particularly, in the wavelength range longer than 1200 nm are low and the performance of cutting off or attenuating the rays in the near infrared region is hence excellent. Accordingly, the infrared-blocking optical filters according to the present invention are useful in applying to uses wherein it is required to prevent exposure to heat rays. Specifically, they are favorably used as optical filters such as near infrared-blocking filters for cutting off or attenuating heat rays attendant on rays of, for example, lighting with lamps or the like, and heat rays in sunlight.

When the transparent substrate has specific light-transmission property by itself, for example, absorption property in an infrared region, the light-transmission properties of the transparent substrate and the infrared-blocking film provided thereon are superposed on each other, and hence an infrared-blocking optical filter having a desired light-transmission property may be provided.

Since the transparent substrates are made of synthetic resins, the infrared-blocking optical filters according to the present invention become light in weight, free from devitrification even in a high-humidity atmosphere and easy to be processed in forming or molding process.

In addition, due to the constitution that the infrared-blocking composite film comprising the infrared-blocking film on a surface of a support member is provided on a surface of the transparent substrate, such possibility is eliminated that the properties of the transparent substrate may be impaired, and moreover protection to the infrared-blocking film can be achieved.

DETAILED DESCRIPTION OF THE INVENTION AND PREFERRED EMBODIMENTS

The present invention will hereinafter be described in detail.

The infrared-blocking optical filter according to the present invention is constituted by a transparent substrate and an infrared-blocking or infrared-non-transmissible film provided on a surface of the transparent substrate. Here, the infrared-blocking film is either of the following infrared-blocking films (A) and (B):

Film (A):
an infrared-blocking film formed of a synthetic resin in which fine powder of a metal oxide material composed of indium oxide and/or tin oxide is dispersed; and Film (B):
an infrared-blocking film formed of a deposit of a metal oxide material composed of indium oxide and/or tin oxide.

[Transparent Substrate]

No particular limitation is imposed on the transparent substrate which is one of the principal components constituting the infrared-blocking optical filter according to the present invention so far as it is made of a transparent material having high light transmittances in a visible region. Therefore, any substrate made of the usual transparent inorganic glass or synthetic resin may be employed. The transparent substrate made of a synthetic resin is preferred because it is light in weight, free from devitrification even in a high-humidity atmosphere and easy to be processed in forming or molding process.

Specific examples of materials for the transparent substrate preferably used in the present invention include materials each having optical properties which meet the conditions that the light transmittance in a visible region be 40–98% at a wavelength of 400 nm, 60–99% at a wavelength of 500 nm, 10–95% at a wavelength of 600 nm, at most 80% at a wavelength of 700 nm and at most 70% at a wavelength of 750 nm.

As specific examples of such materials, may be mentioned inorganic glass in which a metal ion component composed mainly of a copper ion is incorporated in, for example, phosphate glass and the like, and synthetic resins comprising a thermoplastic copolymer or thermosetting copolymer obtained by copolymerizing a phosphate group-containing monomer represented by the formula I (hereinafter referred to as "specific phosphate group-containing monomer") and a monomer copolymerizable therewith, and a metal ion component composed mainly of a divalent copper ion. Each of these transparent materials has a function as an optical filter by itself.

As other materials for the transparent substrate, there may be used synthetic resin compositions obtained by evenly dispersing a dye, pigment or organic coloring matter, for example, a metal complex of phthalocyanine or the like, an anthraquinone dye, a phenylene-diamine derivative, or the like in a resin excellent in transparency, such as an acrylic resin, polycarbonate resin or polyester resin. Besides, as transparent substrates, those may be used which are obtained by coating a coating fluid containing such a composition as mentioned above on a surface of a molded article made of a synthetic resin high in light transmittances in a visible region, such as an acrylic resin, polycarbonate resin or polyester resin.

No particular limitation is imposed on the process for producing such a transparent substrate made of the synthetic resin, and injection molding process, extrusion process or the like, which is a common processing process for molding or forming for thermoplastic resins, may be used. However, when a monomer having crosslinkability due to at least two polymerizable functional groups contained, for example, a monomer in which n is 1 in the formula I, is used as a monomer for obtaining such a synthetic resin, it is preferable to use a cast polymerization process, by which a transparent substrate can be directly obtained, as a polymerization process.

The transparent substrate is preferably high in light transmittances in a visible region, i.e., excellent in transparency irrespective of material and composition. More specifically, it preferably has a light transmittance of 40–98%, preferably 50–95% at a wavelength of 400 nm, 60–99%, preferably 70–98% at a wavelength of 500 nm, 10–95%, preferably 30–90% at a wavelength of 600 nm, at most 80%, preferably at most 75% at a wavelength of 700 nm and at most 70%, preferably at most 65% at a wavelength of 750 nm.

As a synthetic resin having such optical properties, there is preferred a resin comprising a copolymer obtained by copolymerizing a monomer composition composed of a phosphate group-containing monomer represented by the formula I as aforementioned and a monomer copolymerizable therewith, and a metal ion component composed mainly of a divalent copper ion.

Such a synthetic resin has optical properties that the transmittance to rays in a near infrared region is markedly low.

As shown in the formula II, R in the formula I is an acryloyloxy or methacryloyloxy group to which five or less ethylene oxide groups may be bonded. The note m indicative of the number of recurring ethylene oxide groups may be an integer of 0–5. If the value of m exceeds 5, the hardness of the resulting copolymer is lowered to a significant extent, and there is a possibility that the resulting transparent substrate may be lacking in practicability.

The note n indicative of the number of hydroxyl groups in the formula I is selected at 1 or 2 according to the specific molding or forming process employed for obtaining the transparent substrate and to the intended end application. The specific phosphate group-containing monomer in which the value of n is 2, i.e., the number of radical-polymerizable functional groups bonded to the phosphorus atom is 1, becomes one great in bonding ability to a copper ion. On the other hand, the specific phosphate group-containing monomer in which the value of n is 1, i.e., the number of the functional groups is 2, becomes one having crosslinking-copolymerizability.

Therefore, when a transparent substrate is produced from the above material by injection molding process or extrusion process which is a common producing process for thermoplastic resins, the specific phosphate group-containing monomer in which the value of n is 2 is preferably employed.

As described above, the value of n may be selected according to the properties of the resulting transparent substrate, the molding or forming process used and the intended end application. However, it is preferable to use, in combination, a specific phosphate group-containing monomer in the formula I of which the value of n is 1 and another specific phosphate group-containing monomer in the formula I of which the value of n is 2. It is particularly preferable to use these two specific phosphate group-containing monomers in proportions that they account for substantially equal mass ratio to each other, i.e. 47–53 to 53–47, because the solubility of a copper salt used as the metal ion component in the monomer mixture is improved.

The monomer composition for obtaining the copolymer contains at least one copolymerizable monomer together with the specific phosphate group-containing monomer, and the resulting copolymer may be low in hygroscopicity, satisfy hardness conditions required of optical filters and may also be excellent in heat resistance and shape retaining ability. Accordingly, by using such a copolymer for the transparent substrate, some improvements of performance of an optical filter may be realized.

As specific examples of the copolymerizable monomer, may be mentioned lower alkyl acrylates and lower alkyl methacrylates the alkyl group of which has 1–8 carbon atoms, such as methyl acrylate, methyl methacrylate, ethyl acrylate, ethyl methacrylate, n-propyl acrylate and n-propyl methacrylate; modified alkyl acrylates and modified alkyl methacrylates the alkyl group of which is substituted by a glycidyl or hydroxyl group, such as glycidyl acrylate, glycidyl methacrylate and 2-hydroxybutyl methacrylate; polyfunctional acrylates and polyfunctional methacrylates such as ethylene glycol dimethacrylate, diethylene glycol dimethacrylate, polyethylene glycol dimethacrylate, 1,4-butanediol diacrylate, 1,4-butanediol dimethacrylate, 2,2-bis[4-methacryloxyethoxyphenyl] propane, trimethylolpropane triacrylate, pentaerythritol trimethacrylate and pentaerythritol tetramethacrylate; unsaturated carboxylic acids such as acrylic acid and methacrylic acid; and aromatic vinyl compounds such as styrene, α-methylstyrene, halogenated styrenes, methoxy styrene and divinylbenzene.

These compounds may be used either singly or in any combination thereof as the copolymerizable monomer.

In the monomer composition as described above, a proportion by mass of the specific phosphate group-containing monomer to the copolymerizable monomer as used is preferably within a range of from 3:97 to 90:10, more preferably from 30:70 to 80:20. If the proportion of the specific phosphate group-containing monomer is lower than 3 mass %, it is difficult to develop such light absorption property as favorable for the intended optical filter. On the other hand, any proportion exceeding 90 mass % results in a copolymer too high in hygroscopicity and too soft to satisfy the hardness conditions required.

A synthetic resin material suitable for the transparent substrate of the present invention is provided by incorporating the copolymer described above with a specific metal salt component composed mainly of a copper salt.

This specific metal salt component serves to effectively absorb rays having a wavelength in a near infrared region in interaction with the phosphate groups contained in the copolymer. The term "composed mainly of a copper salt" as used herein means that the proportion of the copper ion included in all the metal ions constituting the metal salt component accounts for at least 80 mass %. More specifically, the metal salt component contains a copper salt of a divalent copper ion and metal salts of other metal ions under conditions that the above-described proportions are satisfied. Since the proportion of the copper ion is not lower than 80 mass %, the resulting transparent substrate itself basically effectively absorbs rays having a wavelength in a near infrared region. It is hence preferable to use the metal salt component containing copper ion in such a high proportion.

As the copper salt component principally constituting the specific metal salt component, there may be used various kinds of copper salts. As illustrative examples thereof, may be mentioned anhydrides and hydrides of copper acetate, copper chloride, copper formate, copper stearate, copper benzoate, copper ethylacetoacetate, copper pyrophosphate, copper naphthenate, copper citrate and the like. However, the copper salts are not limited to these listed copper salts only.

As the metal salts composed of the other metal ions constituting the metal salt component, there may be used metal salts containing metal ion components of sodium, potassium, calcium, iron, manganese, cobalt, magnesium, nickel or the like as necessary for the end intended.

The metal salt component composed mainly of the copper salt is preferably contained in a proportion of 0.1–50 parts by mass, more preferably 0.1–40 parts by mass per 100 parts by mass of the copolymer as mentioned above. Any proportion of the metal salt component lower than 0.1 part by mass results in a transparent substrate which fails to effectively absorb rays having a wavelength in a near infrared region. On the other hand, any proportion exceeding 50 parts by mass results in difficulty in evenly dispersing this metal salt component in the copolymer. The content of the copper ion is preferably 0.1–20 parts by mass per 100 parts by mass of the copolymer.

[Infrared-Blocking Film]

In the infrared-blocking optical filter according to the present invention, an infrared-blocking or infrared-non-transmissible film formed of a metal oxide material composed of indium oxide and/or tin oxide (hereinafter referred to as "specific metal oxide") is provided on a surface of the transparent substrate. This infrared-blocking film is either of the following infrared-blocking films (A) and (B):

Film (A):
   an infrared-blocking film formed of a synthetic resin in which fine powder of the specific metal oxide is dispersed (hereinafter, the film A may be referred to as "dispersion type film"); and Film (B):
   an infrared-blocking film formed of a deposit of the specific metal oxide (hereinafter, the film B may be referred to as "deposit type film").

When a metal oxide material composed mainly of indium oxide is used as the specific metal oxide, it is preferable to use a double oxide in which tin atoms are substituted for a part of indium atoms in an indium oxide compound, and oxygen defects are introduced to increase the carrier electron density in the indium oxide compound. The metal oxide material may be called hereinafter "ITO" (indium tin oxide). When a metal oxide material composed mainly of tin oxide is used as the specific metal oxide, it is preferable to use a double oxide in which antimony atoms are substituted for a part of tin atoms in a tin oxide compound, and oxygen defects are introduced to increase the carrier electron density in the tin oxide compound. The metal oxide material may be called hereinafter "ATO" (antimony tin oxide).

It seems that the above-described ITO and ATO have reflecting characteristics that rays are reflected in a range starting from a still shorter wavelength in a near infrared region compared with pure indium oxide and pure tin oxide, respectively, therefore, the light transmittance at a wavelength longer than 1200 nm in the near infrared region can be still more lowered.

As the specific metal oxide used in formation of the dispersion type film, there is preferred fine powder composed mainly of indium oxide and/or tin oxide, for example, fine powder of ITO or ATO, particularly, ultrafine powder having a maximum particle diameter of 0.1 µm or smaller, preferably one having a particle diameter distribution ranging 0.001–0.05 µm.

If the maximum particle diameter of the fine powder of the specific metal oxide exceeds 0.1 µm, the light transmittances in a visible region of the dispersion type film to be formed are lowered in itself, and hence the resulting infrared-blocking optical filter becomes low in light transmittances in the visible region. On the other hand, if the particle diameter distribution of the specific metal oxide includes region smaller than 0.001 µm, the fine powder becomes easy to aggregate, resulting in difficulty in evenly dispersing the particles of the metal oxide material in the synthetic resin. Further, it is also much difficult to prepare such a fine powder itself.

The dispersion type film is such that the fine powder of the specific metal oxide is evenly dispersed in the synthetic resin as a binder which forms the film body. The thickness of the film may range 0.1–50 µm, preferably 0.5–10 µm. The film thickness too great is not preferable because the light transmittances of the infrared-blocking film in the visible region become low. On the other hand, if the thickness of the infrared-blocking film is too small, the light transmittance at a wavelength longer than 1200 nm in a near infrared region becomes high, and hence it is difficult to achieve the intended optical properties.

The synthetic resin used as the binder in this dispersion type film is not limited so far as it is a synthetic resin high in light transmittances in a visible region, i.e., excellent in transparency. As such a resin, there may be used, for example, a thermoplastic resin such as acrylic resin, vinyl chloride resin, styrene resin, polyurethane resin, melamine resin, epoxy resin, polyester resin, polyamide resin, fluorocarbon resin, silicone resin, cellulosic resin or polyvinyl alcohol resin, or a thermosetting resin or a photosetting resin.

If the thermoplastic resin is used as the binder in the formation of the dispersion type film, an organic solvent may be used as a dispersing medium.

Examples of the organic solvent to be used include alcohols such as methyl alcohol, ethyl alcohol, butyl alcohol and hexyl alcohol; ketones such as acetone, methyl ethyl ketone, methyl isobutyl ketone and cyclohexanone; esters such as ethyl acetate, butyl acetate and cellosolve acetate; cyclic ethers such as dioxane and tetrahydrofuran; halogenated hydrocarbons such as methylene chloride and chloroform; aromatic hydrocarbons such as xylene, toluene and benzene; other organic compounds such as cyclohexane, dimethylformamide, dimethylacetamide and acetonitrile; and mixtures thereof.

The dispersion type film is formed by applying a liquid mixture composed of a thermoplastic resin, an organic solvent and fine powder of the specific metal oxide to the transparent substrate and drying it.

If the thermosetting or photosetting resin is employed as the binder, a liquid mixture composed of a precursor of the resin, for example, a polyfunctional acrylic monomer, an organic solvent like that mentioned above, which is used as needed, and the fine powder of the specific metal oxide is coated, dried and cured by heating or irradiation of ultraviolet light or the like, thereby forming the dispersion type film. Among the setting resins, the photosetting resin, particularly, a crosslinked polymer obtained from a composition composed mainly of a photopolymerizable monomer being easily polymerized by ultraviolet-light irradiation or the like, is preferred to be employed because the pot life of the liquid mixture containing the precursor thereof is long, such a mixture is easy to handle and able to be cured without heating to surely avoid the undesirable influence of heat on a transparent substrate even if the transparent substrate is low in heat resistance, and moreover the dispersion type film is formed as a film high in surface hardness and excellent in performance such as chemical resistance, heat resistance and the like.

In the dispersion type film, the content of the fine powder of the specific metal oxide is desirably as high as possible within limits not impeding the adhesive property of the dispersion type film to be formed to the transparent substrate, and the transparency and mechanical properties of the dispersion type film to be formed itself. It is however 30–98 mass %, preferably 50–95 mass % based on the total mass of the dispersion type film.

The deposit type film is formed by directly building up or depositing the specific metal oxide such as ITO or ATO on a surface of the transparent substrate by a vacuum deposition process, sputtering process or the like. The thickness of this deposit type film may range 0.01–10 µm, preferably 0.05–1 µm. The film thickness too great is not preferable because the light transmittances of the infrared-blocking film in the visible region become low. On the other hand, if the thickness of the infrared-blocking film is too small, the light transmittance at a wavelength longer than 1200 nm in a near infrared region becomes high, and hence it is difficult to achieve the intended optical properties.

[Filter Comprising Infrared-Blocking Composite Film]

In the present invention, besides the constitution that the above-described infrared-blocking film of the dispersion type or deposit type is directly formed on the surface of the transparent substrate, it is possible to constitute an infrared-blocking optical filter by forming the same dispersion type or deposit type film as described above on a surface of a suitable transparent support member in the form of a film, sheet or plate, which is different from the transparent substrate, to form an infrared-blocking composite film and bonding or sticking thus obtained composite film to a surface of the transparent substrate with an adhesive or pressure sensitive adhesive.

As the support member, there is preferably used a transparent film, sheet or plate formed of a material high in transmittances to visible rays and excellent in transparency, for example, a polyester resin, acrylic resin, styrene resin, polycarbonate resin, vinyl chloride resin, fluorocarbon resin or inorganic glass.

According to the constitution that such a composite film is provided on the surface of the transparent substrate, it is possible to surely avoid deterioration in the properties of the transparent substrate, said deterioration being caused in the case where the infrared-blocking film is directly formed on the surface of the transparent substrate. Accordingly, excellent light-transmission property can be surely provided by superposed light-transmission properties of both transparent substrate and infrared-blocking film on each other.

In addition, when the composite film is provided on the transparent substrate in such a state that the infrared-blocking film of the composite film comes into direct contact with the surface of the transparent substrate, both sides of the infrared-blocking film can be covered with the transparent substrate and the support member, respectively, so that the infrared-blocking film is in a protected state with them.

[Pretreatment]

Upon the formation of the infrared-blocking film on the surface of the transparent substrate, it is also possible to subject the surface of the transparent substrate to any known surface treatment, for example, primer coating, corona treatment or other physical or chemical pretreatment in order to enhance adhesive property between the film and the substrate.

Besides, when the infrared-blocking film is formed on the surface of the support member, the same pretreatment as described above may be subjected to the surface of the support member.

[EXAMPLES]

The present invention will hereinafter be described by the following examples. However, this invention is not limited to and by these examples.

All designations of "part" or "parts" and "%" as will be used in the following examples mean part or parts by mass and mass %, respectively.

<Preparation Example of Transparent Substrate A>

10 parts of a specific phosphate group-containing monomer represented by the following formula III, 10 parts of another specific phosphate group-containing monomer represented by the following formula IV, 58.5 parts of methyl methacrylate, 20 parts of diethyleneglycol dimethacrylate and 1.5 parts of α-methylstyrene were thoroughly mixed. To this monomer mixture, were added 14 parts (content of copper ion per 100 parts of the monomer mixture: 2.9 parts) of anhydrous copper benzoate. The resultant mixture was thoroughly stirred and mixed at 60° C. to obtain a monomer composition in which the anhydrous copper benzoate was dissolved in the monomer mixture.

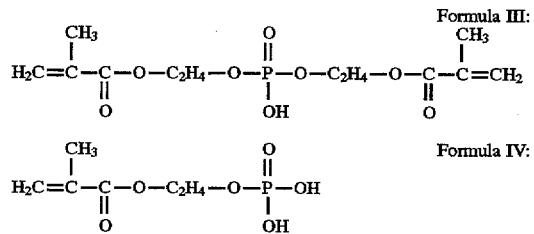

To the monomer composition thus prepared, 2.0 parts of t-butyl peroxypivalate were then added. The resulting monomer mixture was cast in a glass mold and successively heated at varied temperatures as 45° C. for 16 hours, 60° C. for 8 hours and 90° C. for 3 hours to conduct cast polymerization, thereby obtaining a transparent substrate A in the form of a plate 1.6 mm thick, which was composed of a crosslinked copolymer containing a copper ion component therein.

This transparent substrate A had a specific gravity of 1.24 and a refractive index of 1.505.

The light transmittances of this transparent substrate at individual wavelengths as measured by means of a spectrophotometer are shown in Table 1.

Example 1

40 g of ITO ultrafine powder (product of Mitsubishi Materials Corporation) having a particle diameter distribution ranging 0.002–0.005 μm, 53 g of a mixed solvent of xylene and n-butanol at a mass ratio of 8:2 and 7 g of a methyl methacrylate resin as a binder were thoroughly mixed, thereby preparing a coating fluid in which ITO was dispersed in a concentration of 85.1% based on the solid content in the coating fluid.

This coating fluid was applied on one side of the transparent substrate A using a bar coater. The thus-treated substrate was then left for 1 hour in an oven of 100° C. to remove the solvent by evaporation, thereby forming a dispersion type film 2.4 μm thick, in which ITO was contained and dispersed, on the transparent substrate to produce an infrared-blocking optical filter F1.

The light transmittances of this optical filter F1 at individual wavelengths as measured by means of the spectrophotometer are shown in Table 1.

It is apparent from Table 1 that with respect to the optical properties of this optical filter F1, the light transmittances at the wavelengths longer than 1200 nm in a near infrared region lower to a great extent compared with those of the transparent substrate A. On the other hand, loss of light transmittances in a visible region is also slightly recognized. However, the loss is such a degree that the practical transparency is not affected.

Example 2

A polyethylene terephthalate (PET) film ("E-5001 #50", trade name, product of Toyobo Co., Ltd.) having a thickness of 50 μm was used as a support member. The same ITO-dispersed coating fluid as that used in Example 1 was applied on one side of the support member. The thus-treated support member was left for 1 hour in an oven of 100° C. to remove the solvent by evaporation, thereby forming a dispersion type film 2.4 μm thick, in which ITO was contained and dispersed, on the support member to produce an infrared-blocking composite film (a).

This composite film (a) was bonded to a surface of the transparent substrate A through a layer of an optical acrylic pressure sensitive adhesive having a thickness of about 20 μm in such a state that the dispersion type film came into contact with the surface of the transparent substrate A, thereby producing an infrared-blocking optical filter F2.

The light transmittances of this optical filter F2 at the individual wavelengths are shown in Table 1. The light transmittances of the composite film (a) are also shown in Table 1.

As with the case of Example 1, it is found that the optical filter F2 is low in loss of light transmittances in a visible region compared with those of the transparent substrate A, and the light transmittances in a near infrared region lower to a great extent.

Example 3

21 g of ATO ultrafine powder (product of Sumitomo Cement Co., Ltd.) having a particle diameter distribution ranging 0.005–0.015 μm, 70 g of a mixed solvent of toluene and methyl ethyl ketone at a mass ratio of 1:1 and 9 g of a polyester resin ("Elitel", trade name, product of Unichika, Ltd.) as a binder were thoroughly mixed, thereby preparing a coating fluid in which ATO was dispersed in a concentration of 70% based on the solid content in the coating fluid.

This coating fluid was applied on one side of a support member composed of a PET film, "E-5001 #50", having a thickness of 50 μm. The thus-treated support member was left for 1 hour in an oven of 50° C. to remove the solvent by evaporation, thereby forming a dispersion type film 4 μm thick, in which ATO was contained and dispersed, on the support member to produce an infrared-blocking composite film (b).

This composite film (b) was bonded to a surface of the transparent substrate A through a layer of an optical acrylic pressure sensitive adhesive having a thickness of about 20 μm in such a manner that the dispersion type film came into contact with the surface of the transparent substrate A, thereby producing an infrared-blocking optical filter F3.

The light transmittances of this optical filter F3 at the individual wavelengths are shown in Table 1. The light transmittances of the composite film (b) are also shown in Table 1.

In this example, it is also found from Table 1 that the optical filter F3 is low in loss of light transmittances in a visible region compared with those of the transparent substrate A, and the light transmittances in a near infrared region lower to a great extent.

Example 4

In the same manner as in Example 2 except that a transparent substrate B composed of a luminosity factor-compensating filter ("C-500S", trade name, product of HOYA Corporation) made of phosphate glass 2 mm thick was used in place of the transparent substrate A, there was produced an infrared-blocking optical filter F4 in which the infrared-blocking composite film (a) was provided on a surface of the transparent substrate B, the infrared-blocking film of which is a dispersion type film containing ITO dispersed.

The light transmittances of this optical filter F4 at the individual wavelengths are shown in Table 1. The light transmittances of the transparent substrate B are also shown in Table 1.

It is also found from this data that the light transmittances of the optical filter F4 at the wavelengths not shorter than 1200 nm in a near infrared region lower to a great extent compared with those of the transparent substrate B.

Example 5

In the same manner as in Example 2 except that a transparent substrate C, in which an infrared-absorbing film formed with an infrared-absorbing coating fluid "A-1100" (product of Sumitomo Cement Co., Ltd.) on a surface of a substrate body composed of a PET film 50 μm thick, was used in place of the transparent substrate A, there was produced an infrared-blocking optical filter F5 in which the infrared-blocking composite film (a) and the transparent substrate C were stuck to each other in such a state that the surface of the dispersion type film in the infrared-blocking composite film (a) came into contact with the surface of the infrared-absorbing film of the transparent substrate C.

The light transmittances of this optical filter F5 at the individual wavelengths are shown in Table 1. The light transmittances of the transparent substrate C are also shown in Table 1.

It is also found from this data that the light transmittances of the optical filter F5 at the wavelengths not shorter than 1200 nm in a near infrared region lower to a great extent compared with those of the transparent substrate C.

Example 6

An infrared-blocking optical filter F6 was produced in the same manner as in Example 2 except that a composite film formed in a same manner as in the composite film (a) except that the thickness of the dispersion type film formed on the support member was changed to 15 μm was used in place of the infrared-blocking composite film a.

Example 7

An infrared-blocking optical filter F7 was produced in the same manner as in Example 6 except that the thickness of the dispersion type film in the composite film in Example 6 was changed to 8 μm.

Example 8

An infrared-blocking optical filter F8 was produced in the same manner as in Example 6 except that the thickness of the dispersion type film in the composite film in Example 6 was changed to 0.5 μm.

The light transmittances of these three optical filters F6, F7 and F8 at the individual wavelengths are shown in Table 1.

It is found from these data that although the light transmittances in a visible region considerably lower in Example 6, in which the thickness of the dispersion type film was 15 μm, compared with those of the transparent substrate A, and are slightly out of the preferable range, the light transmittances in a near infrared region become zero, and besides the optical filters of Examples 7 and 8 are also excellent in performance of cutting off or attenuating rays in the near infrared region.

Example 9

A deposit type film 0.3 μm thick was formed from ITO on one side of the transparent substrate A by a magnetron sputtering process, thereby producing an infrared-blocking optical filter F9.

The light transmittances of this optical filter F9 at the individual wavelengths are shown in Table 1.

It is found from this data that the optical filter F9 is low in loss of light transmittances in a visible region compared with those of the transparent substrate A, and the light transmittances at the wavelengths not shorter than 1200 nm in a near infrared region lower to a great extent.

Example 10

A polyethylene terephthalate (PET) film, "E-5001 #50", having a thickness of 50 μm was used as a support member. A deposit type film 0.3 μm thick was formed from ITO on one side of the support member by a magnetron sputtering process, thereby obtaining an infrared-blocking composite film (c).

This composite film (c) was bonded to a surface of the transparent substrate A through a layer of an optical acrylic pressure sensitive adhesive having a thickness of about 20 μm in such a state that the deposit type film came into contact with the surface of the transparent substrate A, thereby producing an infrared-blocking optical filter F10.

The light transmittances of this optical filter F10 at the individual wavelengths are shown in Table 1. The light transmittances of the composite film (c) are also shown in Table 1.

It is found from this data that the optical filter F10 is low in loss of light transmittances in a visible region compared with those of the transparent substrate A, and the light transmittances at the wavelengths not shorter than 1200 nm in a near infrared region lower to a great extent.

TABLE 1

| Item | Transmittance (%) | | | | | | | | |
|---|---|---|---|---|---|---|---|---|---|
| Wavelength(nm) | 400 | 500 | 600 | 700 | 750 | 1000 | 1200 | 1500 | 2000 |
| Transparent substrate | | | | | | | | | |
| A | 69 | 86 | 40 | 0.8 | 0.8 | 1.6 | 15 | 55 | 57 |
| B | 81 | 88 | 46 | 1.6 | 0 | 0 | 0.9 | 12 | 53 |
| C | 55 | 74 | 82 | 68 | 58 | 2.8 | 13 | 71 | 88 |
| Composite film | | | | | | | | | |
| a | 59 | 74 | 75 | 72 | 70 | 43 | 11 | 0 | 0 |
| b | 74 | 77 | 76 | 73 | 71 | 58 | 39 | 14 | 1.6 |
| c | 50 | 85 | 90 | 85 | 80 | 40 | 16 | 5 | 0 |
| Example 1 | 36 | 64 | 40 | 0.4 | 0 | 0.4 | 1.1 | 0 | 0 |
| Example 2 | 44 | 65 | 33 | 0.6 | 0 | 0.5 | 1.2 | 0 | 0 |
| Example 3 | 52 | 73 | 36 | 0.6 | 0 | 0.5 | 5.2 | 8 | 1 |
| Example 4 | 51 | 67 | 34 | 1.0 | 0 | 0 | 0 | 0 | 0 |
| Example 5 | 32 | 55 | 61 | 48 | 38 | 0.8 | 0.8 | 0 | 0 |
| Example 6 | 13 | 44 | 22 | 0 | 0 | 0 | 0 | 0 | 0 |
| Example 7 | 23 | 57 | 29 | 0.2 | 0 | 0.1 | 0.3 | 0 | 0 |
| Example 8 | 58 | 74 | 38 | 0.7 | 0.7 | 1.3 | 9 | 9 | 2 |
| Example 9 | 35 | 60 | 36 | 0.3 | 0.2 | 0.6 | 1.2 | 2.5 | 0 |
| Example 10 | 32 | 58 | 35 | 0.3 | 0.2 | 0.5 | 1.1 | 2.4 | 0 |

What is claimed is:

1. An infrared-blocking optical filter comprising a transparent substrate and an infrared-blocking film provided on a surface of the transparent substrate:

said infrared-blocking film being formed of a synthetic resin in which fine powder of a metal oxide material composed of indium oxide or tin oxide or a mixture thereof is dispersed, wherein the infrared-blocking film has a thickness of 0.1–50 μm and a content of the fine powder of the metal oxide material is 30–98 mass % based on the total mass of the infrared-blocking film.

2. The infrared-blocking optical filter according to claim 1, wherein the transparent substrate is formed of a material having light transmittances of 40–98% at a wavelength of 400 nm, 60–99% at a wavelength of 500 nm, 10–95% at a wavelength of 600 nm, at most 80% at a wavelength of 700 nm and at most 70% at a wavelength of 750 nm.

3. The infrared-blocking optical filter according to claim 1, wherein the transparent substrate comprises a copolymer component obtained by copolymerizing a monomer composition composed of a phosphate group-containing monomer represented by the following formula I and a monomer copolymerizable therewith, and a metal ion component composed mainly of a divalent copper ion:

Formula I:

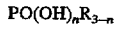

PO(OH)$_n$R$_{3-n}$ wherein R means a polymerizable functional group represented by the following formula II, and n stands for 1 or 2:

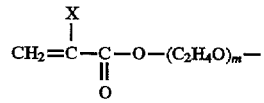

Formula II:

$$CH_2=C-C-O-(C_2H_4O)_m-$$
with X above C and O double-bonded to the middle C in which X denotes a hydrogen atom or a methyl group, and m stands for an integer of 0–5.

4. The infrared-blocking optical filter according to claim 3, wherein the monomer composition for the copolymer component includes two kinds of the phosphate group-containing monomers, one of which being represented by the Formula I wherein the value of n is 1 and another of which being represented by the Formula I wherein the value of n is 2.

5. The infrared-blocking optical filter according to claim 1, wherein the metal oxide material constituting the infrared-blocking film is a double oxide composed of indium oxide and tin oxide.

6. The infrared-blocking optical filter according to claim 1, wherein the metal oxide material constituting the infrared-blocking film is a double oxide composed of tin oxide and antimony oxide.

7. The infrared-blocking optical filter according to claim 1, wherein the fine powder of the metal oxide material has a particle diameter distribution of 0.001–0.1 μm.

8. An infrared-blocking optical filter comprising a transparent substrate and a composite film provided on a surface of the transparent substrate, wherein the composite film comprises a transparent support member and an infrared-blocking member formed on a surface of the transparent support member:

said infrared-blocking member of the composite film being formed of a synthetic resin in which the fine powder of a metal oxide material composed of indium oxide or tin oxide or a mixture thereof is dispersed, wherein the infrared-blocking member has a thickness of 0.1–50 μm and a content of the fine powder of the metal oxide material is 30–98 mass % based on the total mass of the infrared-blocking member.

9. The infrared-blocking optical filter according to claim 8, wherein the composite film is laminated on the transparent substrate in such a state that the infrared-blocking member comes into contact with the surface of the transparent substrate.

10. The infrared-blocking optical filter according to claim 8, wherein the transparent substrate is formed of a material having light transmittances of 40–98% at a wavelength of 400 nm, 60–99% at a wavelength of 500 nm, 10–95% at a wavelength of 600 nm, at most 80% at a wavelength of 700 nm and at most 70% at a wavelength of 750 nm.

11. The infrared-blocking optical filter according to claim 8, wherein the transparent substrate comprises a polymer component obtained by copolymerizing a monomer composition composed of a phosphate group-containing monomer represented by the following formula I and a monomer copolymerizable therewith, and a metal ion component composed mainly of a divalent copper ion:

Formula I:

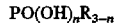

$PO(OH)_n R_{3-n}$ wherein R means a polymerizable functional group represented by the following formula II, and n stands for 1 or 2:

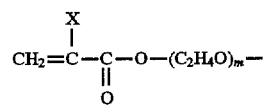

Formula II:

in which X denotes a hydrogen atom or a methyl group, and m stands for an integer of 0–5.

12. The infrared-blocking optical filter according to claim 11, wherein the monomer composition for the copolymer component includes two kinds of the phosphate group-containing monomers, one of which being represented by the Formula I wherein the value of n is 1 and another of which being represented by the Formula I wherein the value of n is 2.

13. The infrared-blocking optical filter according to claim 8, wherein the metal oxide material constituting the infrared-blocking film is a double oxide composed of indium oxide and tin oxide.

14. The infrared-blocking optical filter according to claim 8, wherein the metal oxide material constituting the infrared-blocking film is a double oxide composed of tin oxide and antimony oxide.

* * * * *